April 8, 1930.　　　J. W. CATES　　　1,753,549
CAKE ICING MACHINE
Filed Oct. 16, 1928　　　4 Sheets-Sheet 1
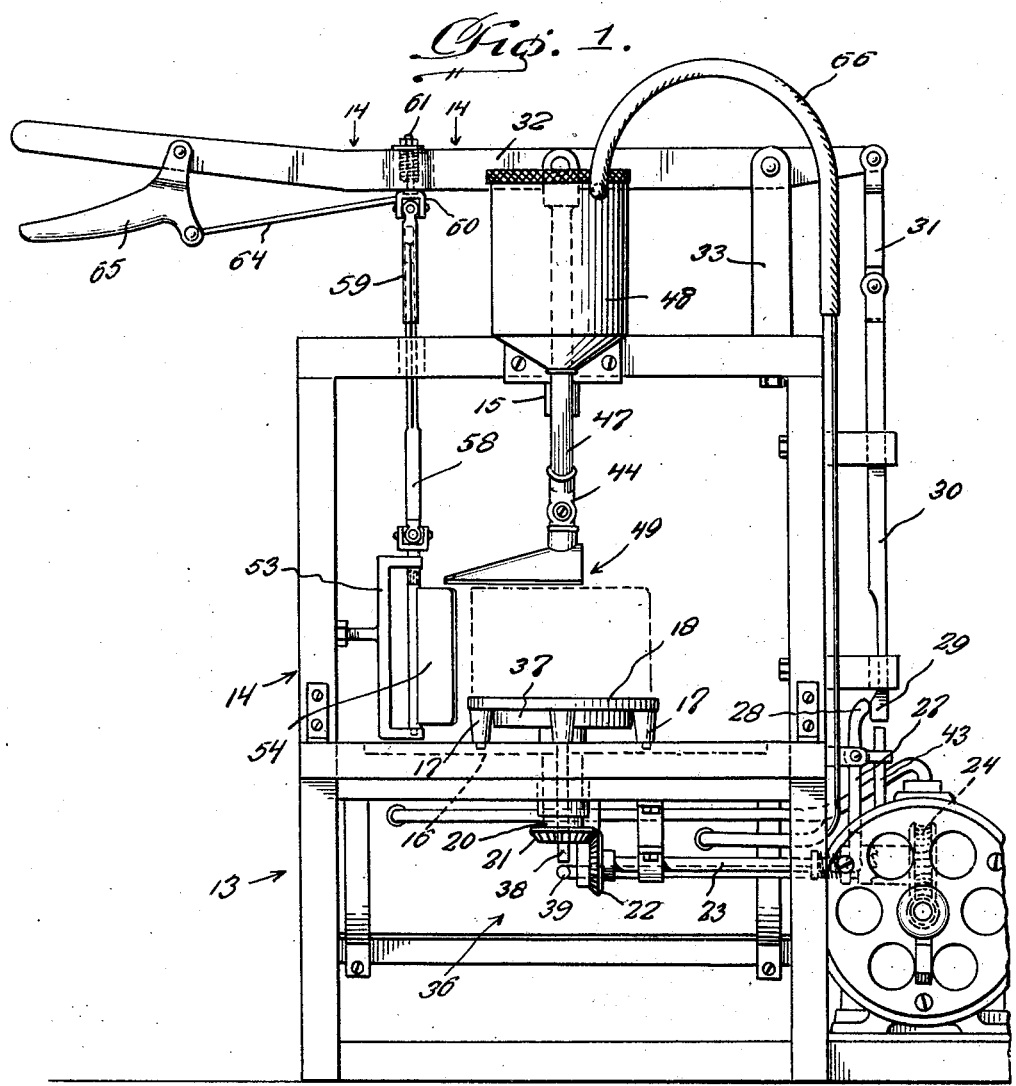
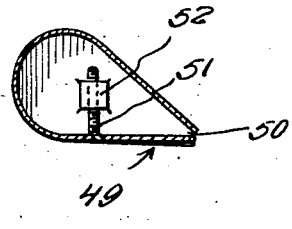
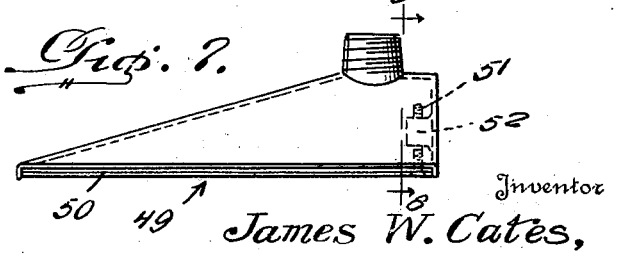
Inventor
James W. Cates,
By J. Stanley Burch
Attorney

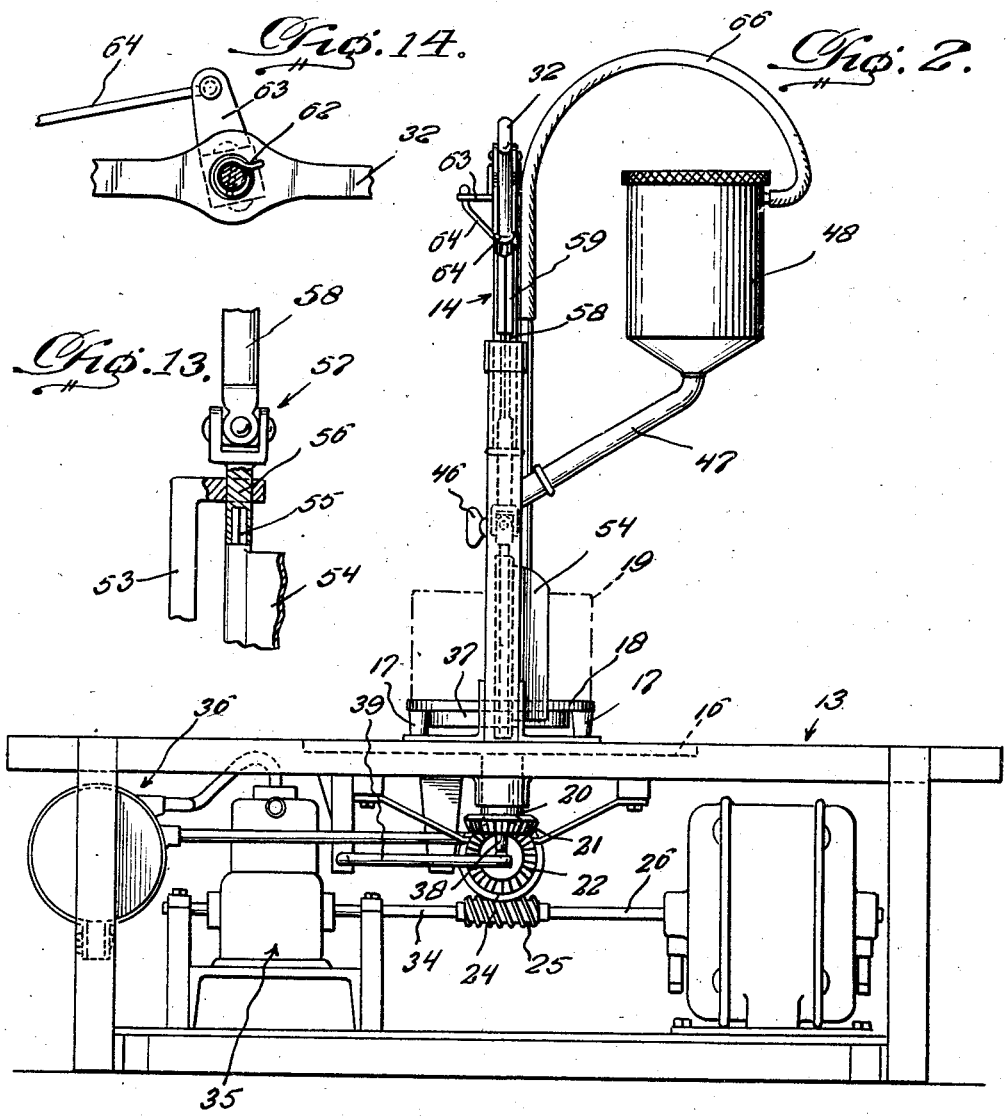

April 8, 1930.  J. W. CATES  1,753,549
CAKE ICING MACHINE
Filed Oct. 16, 1928  4 Sheets-Sheet 3
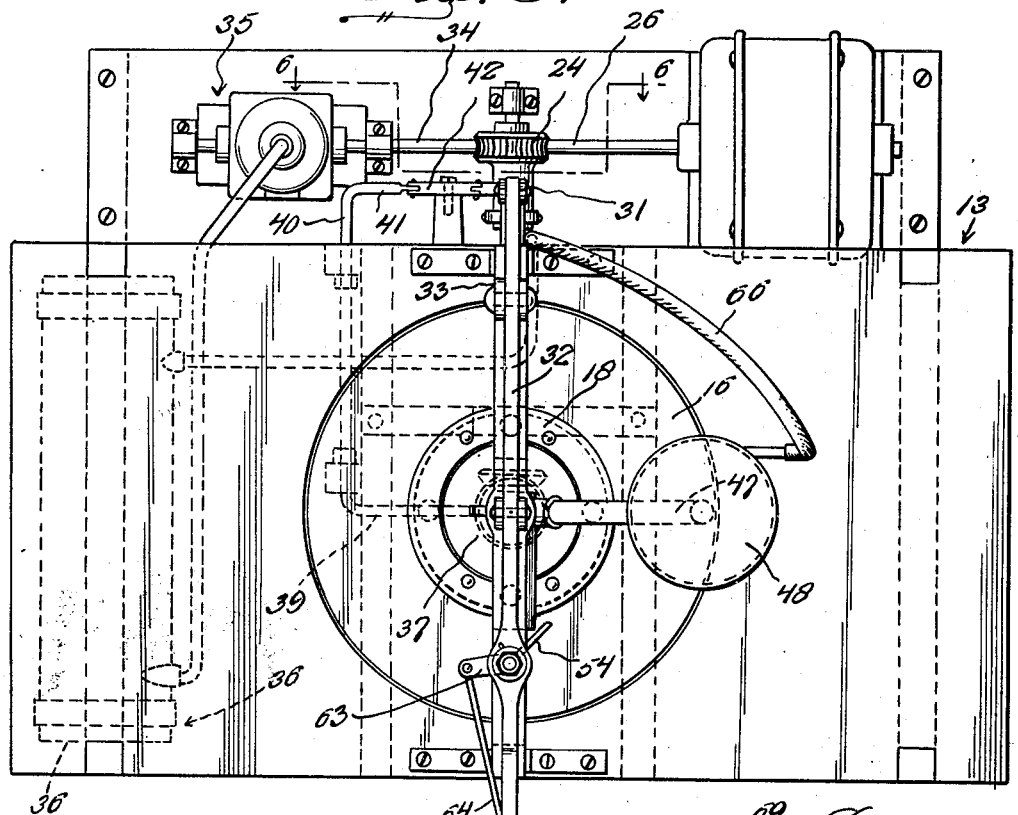
Fig. 3.
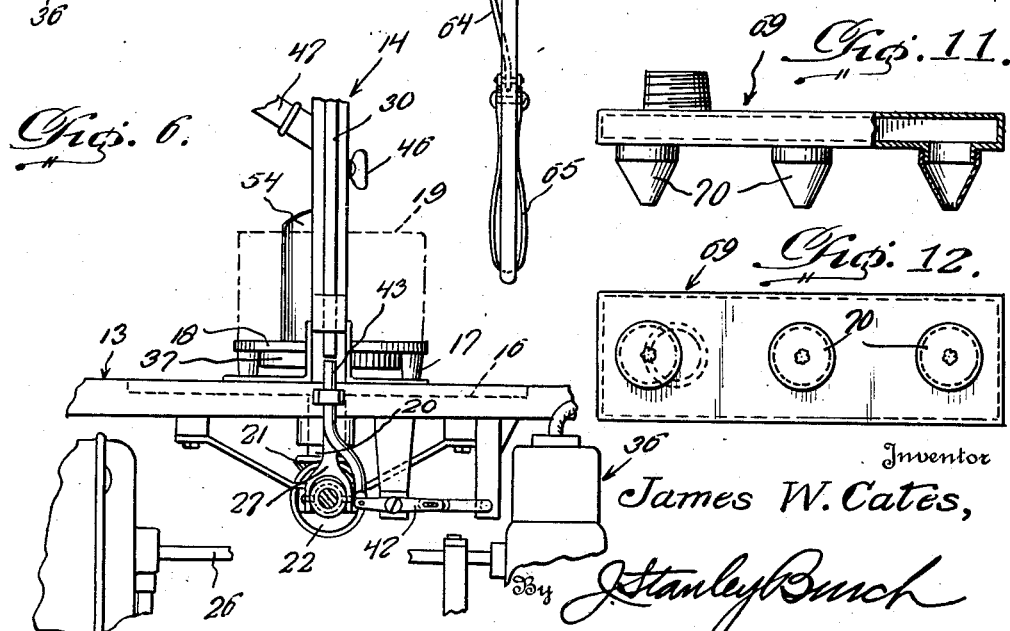
Fig. 6.
Fig. 11.
Fig. 12.
Inventor
James W. Cates,
By Stanley Burch
Attorney April 8, 1930.  J. W. CATES  1,753,549
CAKE ICING MACHINE
Filed Oct. 16, 1928  4 Sheets-Sheet 4
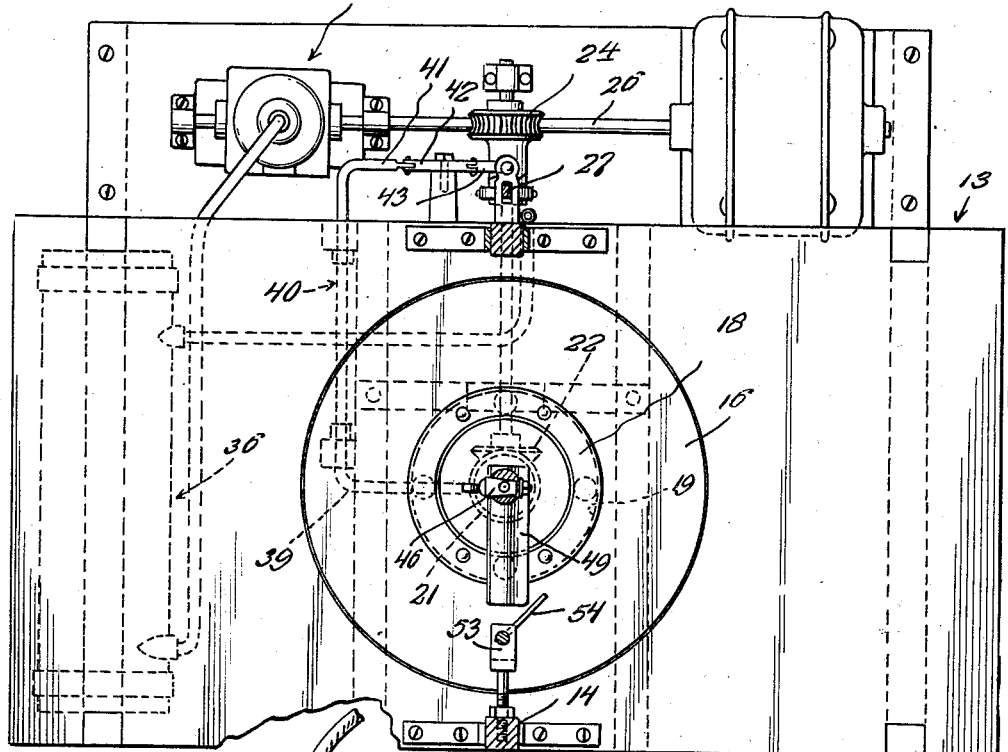
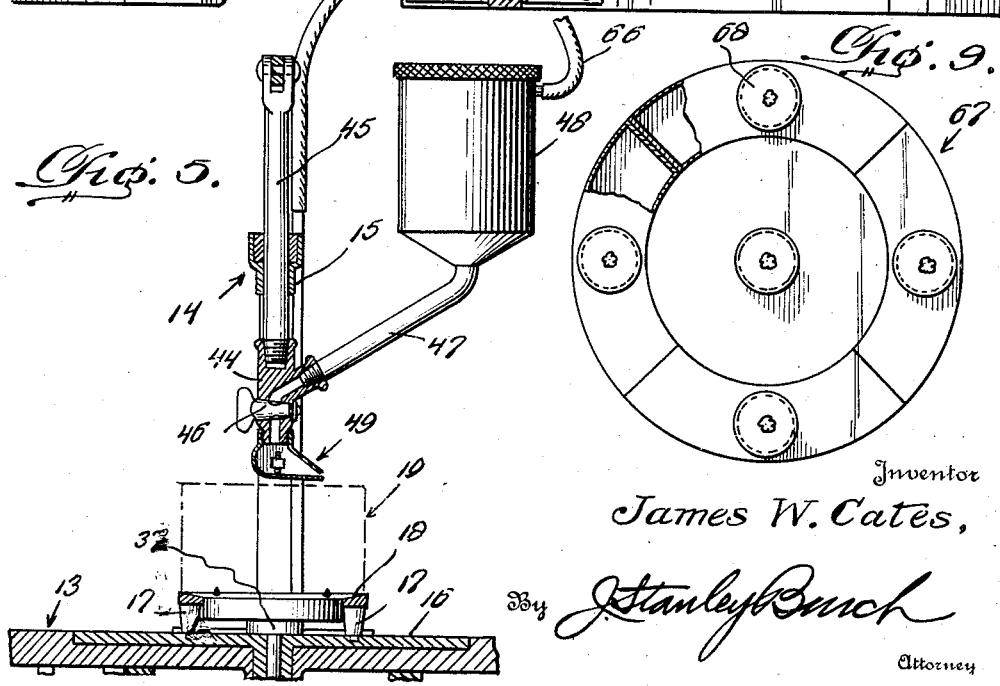
Inventor
James W. Cates,
By J. Stanley Burch
Attorney Patented Apr. 8, 1930

1,753,549

UNITED STATES PATENT OFFICE

JAMES W. CATES, OF COFFEYVILLE, KANSAS

CAKE-ICING MACHINE

Application filed October 16, 1928. Serial No. 312,779.

This invention has reference to an improved machine which is especially adapted for use in bakeries and confectionery manufacturing establishments, and it has more particular reference to a machine for icing cakes.

The machine herein shown and described is an improvement upon the cake icing machine covered in a previous patent granted to me under date of February 18, 1927, and designated as 1,618,053.

The machine of this application is distinguished from the aforesaid prior patent and other known machines in the art in a number of respects. First, it is characterized by a novel electric motor drive and automatically operable clutch structure arranged to propel a rotary disk upon which the cake carrier is removably, but operatively seated. This arrangement is advantageous in that it is positive and dependable in operation and because of the fact that it permits different but standardized cake carriers to be utilized.

Secondly, the machine is individual in that it includes a practical and novel icing applicator and distributing means which is mounted for accurate movement toward and from the cake, whereby said means can be regulated according to the will of the operator and the size of the cake.

Then too, a closely associated improvement is based upon an ejector which is cooperable with the rotary cake carrier.

A further feature of the invention is found in a manually operable device for actuating the icing applicator toward and from the work, this means serving to simultaneously control a thickness gage and spreader for the icing on the sides of the cake.

My principal object is to provide a machine which possesses these features and additional structural improvements which are associated and which cooperate in a manner to render the machine positive and dependable in action, entirely efficient in performance, and capable of fulfilling the requirements of an invention of this class in a suitable manner.

In the drawings:

Figure 1 is an end elevational view of a cake icing machine constructed in accordance with the present invention.

Figure 2 is a side elevational view of the same.

Figure 3 is a top plan view thereof.

Figure 4 is a horizontal sectional view.

Figure 5 is a fragmentary detail section and elevation showing the rotary cake carrier and the distributing head of the icing applicator.

Figure 6 is a fragmentary detail view of features of the clutch operating means, the section being taken approximately upon the plane of the line 6—6 of Figure 3.

Figure 7 is a side view of the distributing head.

Figure 8 is a vertical end section taken on the line 8—8 of Figure 7.

Figure 9 is a top plan view, partly in section, of a revised or modified type of distributing head.

Figure 10 is a side or edge view of Figure 9.

Figure 11 is an edge view of still further type of distributing head.

Figure 12 is a bottom plan view of Figure 11.

Figure 13 is a fragmentary detail section on an enlarged scale showing certain of the features of the thickness gage device; and Figure 14 is a section on the line 14—14 of Figure 1.

Referring now to the drawings by reference numerals it will be seen that 13 designates generally a support which is more in the nature of a table. Disposed on the central portion of the table top and suitably supported is an upright 14 of general arch design, the horizontal top bar of which is provided with a guide 15 located in vertical alinement with a rotary disk 16 seated in a recess in the table top as shown in Figure 5. This disk is provided with circumferentially spaced sockets receiving dowel pins on the lower ends of legs 17 carried by an annular cake carrier 18. Incidentally the cake is designated in dotted lines at 19 and it is placed upon the annular carrier and properly held thereon by spurs or the like as shown in Figure 5. The disk 16 has a tubular drive shaft 20 having a beveled gear 21 on its bottom in mesh with a complemental driving gear 22. The gear 22 is mounted on a shaft 23 journaled in suitable bearings, which shaft receives its motion from a worm 24 which is in mesh with the threads of a cooperating worm 25 on the motor shaft 26 as seen in Figure 2. Incidentally, a normally open clutch is provided here, the clutch being operated through the medium of a swingably mounted forked lever 27 as shown in Figure 1. In this connection it will be noted that the lever has a cam head 28 on its upper end cooperable with a coacting cam head 29 on the lower notched end of a vertically slidable clutch throw rod 30. The rod 30 is operable in suitable guides and connected with a short link 31 which is in turn connected to the short pivoted end of the main operating lever 32. This lever is supported on an appropriate bracket 33 carried by the upright. It will thus be seen how the operating lever 32 may be manipulated up and down to control the clutch lever.

While considering the motor driving portion of the machine it is well to note that the motor shaft 26 has an extension 34 as seen in Figure 2 which operates an air compressor 35. This air compressor generates compressed air for a storage tank 36.

Closely associated with the parts described and particularly the rotary annular carrier 18 is a cake lifter 37 (see Figure 5). This comprises a disk-like head on the upper end of a slidable stem mounted in the tubular shaft 20. The depending lower end of this stem designated at 38 in Figure 2 cooperates with a horizontal arm 39 on a substantially U-shaped rocker 40 which oscillates in appropriate bearings on the under side of the table top. The rocker 40 extends out beyond one edge of the table where it has a short arm 41 connected with a link 42 which as shown in Figure 6 operates an upstanding arm 43. The arm 43 as shown in Figure 6 is located directly beneath the head 29 on the lever rod 30 (see also Figure 1). In this connection it is obvious that the ejector is successively and separately operable clutch and the rotary cake carrier.

Attention is now invited to the vertically shiftable icing applicator which is better shown in Figure 5. As here represented it comprises a bored fitting 44 on the lower end of a connecting rod 45 which is pivotally connected at its upper end to the intermediate portion of the aforesaid lever 32. In this fitting is a rotary plug valve 46 which controls the flow of the liquid icing down through the discharge tube 47. The tube 47 is connected with the icing reservoir 48 and it communicates by way of the valve with the distributing head 49. The distributing head as shown in Figure 7 is of general tapered design and is provided with a restricted discharge slot 50 for spreading the icing in a ribbon-like form. As shown in Figure 8 the lower flexible wall of this distributing head may be adjusted through the medium of a screw 51 passing through a screw threaded anchor 52 on the interior. This regulates flow of the fluid.

I now wish to invite attention to a thickness gage and spreader device which is associated with the rotary cake carrier and the operating lever 32. The general arrangement is better seen in Figure 1 wherein it will be observed that 53 designates a stationary yoke mounted on the upright along side of the rotary carrier. Supported for oscillation upon the yoke is a vertical blade which scrapes, smooths, and regulates the thickness of the icing as it is coated on the cake. As shown in Figure 13 the blade has a trunnion at its lower end rotatably mounted in a suitable bearing on the lower arm of the yoke. On its upper end however it is provided with a stub shaft 55 of square cross section fitting into a correspondingly shaped socket in a coupling member 56 on the upper arm of the yoke. The coupling member has universal connection at 57 with a vertical oscillatory shaft 58 which in turn is telescopically fitted in a tubular shaft section 59. Incidentally, the upper portion of the shaft 58 is square in cross section and the tubular shaft section 59 is of a corresponding cross section to produce the desired oscillatory motion. The shaft section 59 is operatively connected as at 60 with a bolt 61 mounted in an appropriate opening in the lever 32. A return spring 62 (see Figure 14) is connected with this bolt. Moreover, a crank arm 63 is connected therewith and a link 64 is connected with the crank arm at one end and at its opposite end is connected with a pivoted hand grip 65 carried by the lever 32 as shown plainly in Figure 1. Normally, the spring 62 holds the blade 53 in a position away from the cake as shown in Figure 1. It is yet to be mentioned that a suitable conduit 66 is provided and is connected at one end with the compressed air tank 36 and at its opposite end is the icing reservoir 48 thus introducing air under pressure into the reservoir to force the fluid down through the tube 47 and the distributing head 49.

The operation of the machine is as follows. Under normal conditions the parts of the machine are as represented in Figure 1. In this position, the motor, if on, is idling. However, by operating the clutch lever 27 the clutch may be thrown in whereby to rotate the propeller shaft 23 and to drive the rotary cake carrier 18 through the medium of the shafting and gearing. To operate the lever 28, the operator catches hold of the handle portion of the lever 32 moving it downwardly toward the table thereby swinging the short pivoted end upwardly. This produces an upward motion of the link 31 and the clutch rod 30. Consequently the head 29 is brought into cam coaction with the head 28 to operate the clutch. As this lever 32 is thus swung downwardly it serves to bring the icing applicator device or means into play. That is, it moves the connecting rod 45 down through the guide 15 in the arched upright. Obviously then this brings the distributing head 49 into a place just above the cake where the flow of the fluid may be regulated as before described. Thus, we have a simultaneous and properly timed operation of the clutch and the icing applicator means. When the control valve 46 is opened the icing flows out the cake in an obvious manner. The thickness of the icing may be gaged by the oscillatory blade 54. It is evident that by catching hold of the hand grip 65 and moving it toward the handle portion of the lever 32, this will actuate the link 64 and the shaft section 59 and 58 respectively. This in turn operates the blade 54 to bring it from the normally inoperative position into close proximity to the side of the cake. Thus, it serves as a scraper and a spreader as well as a thickness gage. Of course this portion of the device may be brought into play at any desired time. In fact it may be held in the proper position during the icing operation. By operating the lever 32 in the opposite direction and moving the rod 31 down the clutch is allowed to disengage owing to the fact that the head 28 drops into the notched edge portion of the rod 30. In other words, the heads 28 and 29 becomes disengaged. As the rod thus moves down it impinges upon the arm 43 (see Figure 6) and this moves the arm down and actuates the link 32 which in turn serves to rock the rocker member 40. Thus the arm 39 actuates the lifter head 37 as is obvious from Figure 5 to lift or eject the cake 19 from the annular carrier. Consequently it will be seen that these different steps are well timed and properly related to insure positive and convenient operation.

Under some conditions it is desirable to provide the different forms of distributing head for fancy work. For example as seen in Figures 9 and 10 the head 67 is of general disk-like design and is composed of individual compartments having individual discharge nozzles at 68. Also as shown in Figures 11 and 12 the head might well be of rectangular design as designated at 69 in Figure 11 and provided with a row of discharge nozzles 70. In either instance suitable couplings will be provided whereby the head can be substituted for the aforesaid head 49.

It is thought that by carefully considering the drawings in connection with the description a clear understanding of the construction, operation and advantages of the invention will be had. Therefore, a more lengthy description is regarded unnecessary.

In actual practice, minor changes may be resorted to, so long as they remain within the spirit of the invention herein described and the scope of the following claims.

I claim:

1. In a cake icing machine of the class described, a supporting table having a recessed top, a rotary disk seated in said recess and having a depending tubular drive shaft, said disk being provided with circumferentially spaced sockets, a prime mover, an operating connection between the prime mover and tubular drive shaft, an annular leg equipped cake carrier, the legs of which are provided with dowel pins removably seated in the sockets in said disk.

2. In a cake icing machine of the class described, a supporting table having a recessed top, a rotary disk seated in said recess and having a depending tubular drive shaft, said disk being provided with circumferentially spaced sockets, a prime mover, an operating connection between the prime mover and tubular drive shaft, an annular leg equipped cake carrier, the legs of which are provided with dowel pins removably seated in the sockets in said disk, a lifter head associated with said carrier and including a vertical stem slidable through said tubular drive shaft, and operating means for said stem.

3. In a cake icing machine of the class described, a support, a movable cake carrier on said support, an arched upright on said support including a guide, an operating lever fulcrumed on said upright, a connecting rod extending slidably through a guide on said upright and pivotally connected at its upper end to the intermediate portion of said lever, and valved icing supply and distributing means on the lower end of said rod.

4. In a cake icing machine of the class described, a movable cake support, an arched upright, the horizontal top bar of which is provided with a vertical guide, a lever fulcrumed on said upright, a connecting rod slidable through said guide and pivotally connected at its upper end to the intermediate portion of said lever, a fitting on the lower end of said rod over said cake support, an adjustable distributing head on said fitting, a valve in said fitting, and a connection between the reservoir and fitting.

5. In a cake icing machine of the class described, a supporting table, a movable cake carrier on said supporting table, an operating lever fulcrumed on said table, an adjustable icing applicator carried by said lever and movable toward and from said carrier, a thickness gage and spreader device on said support and cooperable with said carrier, and operating means for said device mounted on said lever.

6. In a cake icing machine of the class described, a supporting table, a movable cake carrier on said table, an operating lever pivoted on said table, an icing applicator connected with said lever and movable toward and from said carrier, a yoke supported on the table adjacent said cake carrier, an oscillatory gage blade mounted on said yoke, and an operating connection for said blade connected with said operating lever.

7. In a cake icing machine of the class described, a supporting table, a movable cake carrier on said table, an operating lever pivoted on said table, an icing applicator connected with said lever and movable toward and from said carrier, a yoke supported on the table adjacent said cake carrier, an oscillatory gage blade mounted on said yoke, and an operating connection for said blade connected with said operating lever, and including a sectional shaft, an automatic maintenance spring for holding said blade in a normally out-of-the-way position, a pivoted hand grip on said lever, and an operating connection between said hand grip and sectional shaft.

8. In a cake icing machine of the class described, a support, a rotary cake carrier on said support, an electric motor including a drive having a clutch provided with a clutch lever, said lever having a cam head on its upper end, an operating lever on said support, a clutch lever rod slidable on said support and provided with a cam head for cooperation with the head on said clutch lever.

9. In a cake icing machine of the class described, a supporting table, a rotary cake carrier on said table, a motor including a clutch and an operating connection for said carrier, an operating lever on said table, an operating connection between said lever and clutch, an icing applicator and distributing device connected with the intermediate portion of said lever and movable toward and from said cake carrier, a thickness gage and scraping device mounted on the support adjacent the applicator and carrier, and an operating connection between said gage and lever.

10. In a cake icing machine of the class described, a supporting table provided with a rotary disk, a cake carrier on said disk, a lifter head associated with said carrier, and operating means for said lifter head.

In testimony whereof I affix my signature.

JAMES W. CATES.